(12) United States Patent  
Muellen et al.

(10) Patent No.: US 7,445,864 B2  
(45) Date of Patent: Nov. 4, 2008

(54) FUNCTIONALIZED POLYAZOLES, METHOD FOR THE PRODUCTION THEREOF, AND USE THEREOF

(75) Inventors: Klaus Muellen, Köln (DE); Markus Klapper, Mainz (DE); Vesselin Sinigersky, Sofia (BG); Weicheng Wu, Mainz (DE); Oemer Uensal, Mainz (DE); Jochen Baurmeister, Eppstein (DE)

(73) Assignee: BASF Fuel Cell GmbH, Frankfurt am Main (DE)

( * ) Notice: Subject to any disclaimer, the term of this patent is extended or adjusted under 35 U.S.C. 154(b) by 243 days.

(21) Appl. No.: 10/520,326

(22) PCT Filed: Jul. 2, 2003

(86) PCT No.: PCT/EP03/07020

§ 371 (c)(1),  
(2), (4) Date: Oct. 5, 2005

(87) PCT Pub. No.: WO2004/005373

PCT Pub. Date: Jan. 15, 2004

(65) Prior Publication Data

US 2006/0234099 A1    Oct. 19, 2006

(30) Foreign Application Priority Data

Jul. 6, 2002    (DE) ............................... 102 30 477

(51) Int. Cl.
```
H01M 8/10    (2006.01)
H01M 8/02    (2006.01)
C08G 73/06   (2006.01)
C08G 73/18   (2006.01)
```

(52) U.S. Cl. ........................................ 429/33; 528/423

(58) Field of Classification Search ................. 429/10, 429/30, 33–34, 29; 528/423  
See application file for complete search history.

(56) References Cited

U.S. PATENT DOCUMENTS 3,224,908 A    12/1965    Duch et al.

(Continued)

FOREIGN PATENT DOCUMENTS

DE    1 301 578    8/1969

(Continued)

OTHER PUBLICATIONS

IPDL Machine Translation and Abstract in English of JP09-110982.*

(Continued)

*Primary Examiner*—Alexa D. Neckel  
*Assistant Examiner*—Claire L Rademaker  
(74) *Attorney, Agent, or Firm*—Hamilton, Brook, Smith & Reynolds, P.C.

(57) ABSTRACT

The present invention relates to functionalized polyazoles comprising recurring imidazole units of the general formula

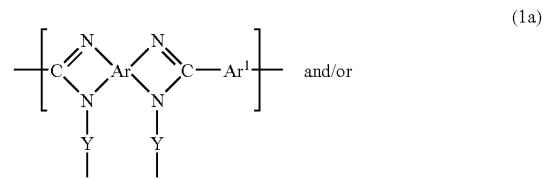
(1a)
and/or

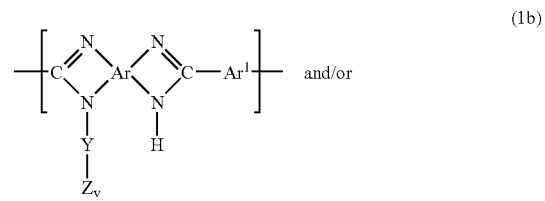
(1b)
and/or

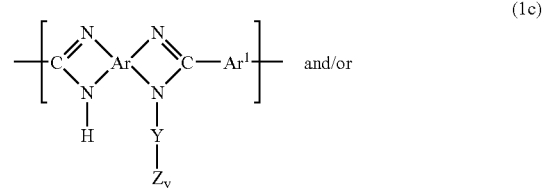
(1c)
and/or

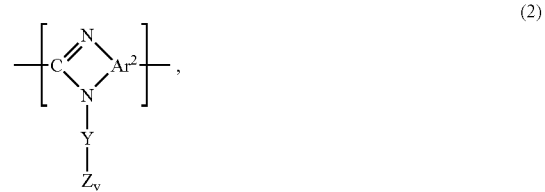
(2)

where the radicals Ar, $Ar^1$ and $Ar^2$ are tetravalent, divalent or trivalent aromatic or heteroaromatic groups,  
Y is a bond or a group having from 1 to 20 carbon atoms,  
v is an integer from 1 to 10 and  
Z is a group of the general formula

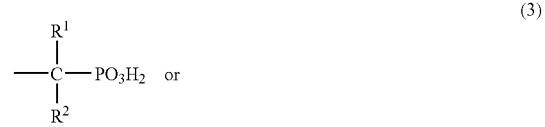
(3)

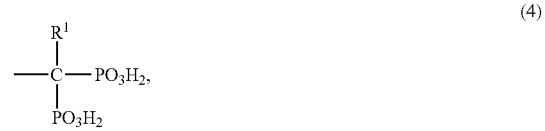

(4)

where $R^1$ and $R^2$ are each, independently of one another, a hydrogen atom or a group having from 1 to 20 carbon atoms, characterized in that the polyazole is soluble in organic solvents. Furthermore, the present invention relates to intermediates and to a process for preparing the polyazoles. Furthermore, the present invention describes polymer electrolyte membranes and fuel cells in which the polyazoles of the invention are present.

18 Claims, No Drawings

U.S. PATENT DOCUMENTS

| | | | |
|---|---|---|---|
| 3,293,088 A | 12/1966 | Herbst et al. | |
| 3,313,783 A | 4/1967 | Iwakura et al. | |
| 3,737,045 A | 6/1973 | Hasimoto et al. | |
| 3,808,305 A | 4/1974 | Gregor | |
| 4,012,303 A | 3/1977 | D'Agostino et al. | |
| 4,075,093 A | 2/1978 | Walch et al. | |
| 4,187,333 A | 2/1980 | Rembaum et al. | |
| 4,191,618 A | 3/1980 | Coker et al. | |
| 4,212,714 A | 7/1980 | Coker et al. | |
| 4,333,805 A | 6/1982 | Davidson et al. | |
| 4,537,668 A | 8/1985 | Gaussens et al. | |
| 4,622,276 A | 11/1986 | Walsh | |
| 4,634,530 A | 1/1987 | Kuder et al. | |
| 5,098,985 A | 3/1992 | Harris et al. | |
| 5,211,984 A | 5/1993 | Wilson | |
| 5,218,076 A | 6/1993 | Madison et al. | |
| 5,312,895 A | 5/1994 | Dang et al. | |
| 5,492,996 A | 2/1996 | Dang et al. | |
| 5,525,436 A * | 6/1996 | Savinell et al. | 429/30 |
| 5,599,639 A | 2/1997 | Neoya et al. | |
| 5,633,337 A | 5/1997 | Tan et al. | |
| 5,643,968 A | 7/1997 | Andreola et al. | |
| 5,656,386 A | 8/1997 | Scherer et al. | |
| 5,674,969 A | 10/1997 | Sikkema et al. | |
| 6,030,718 A | 2/2000 | Fuglevand et al. | |
| 6,087,032 A | 7/2000 | Yoshitake et al. | |
| 6,096,369 A | 8/2000 | Anders et al. | |
| 6,110,616 A | 8/2000 | Sheikh-Ali et al. | |
| 6,197,147 B1 | 3/2001 | Bönsel et al. | |
| 6,248,469 B1 | 6/2001 | Formato et al. | |
| 6,368,587 B1 | 4/2002 | Anders et al. | |
| 2001/0038937 A1 | 11/2001 | Suzuki et al. | |
| 2002/0045085 A1 | 4/2002 | Formato et al. | |
| 2004/0062969 A1 * | 4/2004 | Sakaguchi et al. | 429/33 |
| 2004/0101731 A1 | 5/2004 | Jakoby et al. | |

FOREIGN PATENT DOCUMENTS

| | | |
|---|---|---|
| DE | 196 53 484 A1 | 6/1998 |
| DE | 101 48 131 A1 | 5/2003 |
| EP | 0 265 921 A2 | 5/1988 |
| EP | 0 265 921 A3 | 5/1988 |
| EP | 0 476 560 A1 | 9/1991 |
| EP | 0 846 733 A2 | 6/1998 |
| EP | 0 893 165 A2 | 1/1999 |
| EP | 1 110 992 A1 | 6/2001 |
| EP | 1 202 365 A1 | 5/2002 |
| EP | 1354907 A1 | 10/2003 |
| JP | 53-97988 | 8/1978 |
| JP | 09110982 A * | 4/1997 |
| JP | 2002146014 | 5/2002 |
| JP | 2003022709 | 1/2003 |
| WO | WO 94/25506 | 11/1994 |
| WO | WO 99/10165 | 3/1999 |
| WO | WO 00/49069 | 8/2000 |
| WO | WO 00/54351 | 9/2000 |
| WO | WO 01/45192 A1 | 6/2001 |
| WO | WO 01/94450 A2 | 12/2001 |
| WO | WO 02/36249 A1 | 5/2002 |
| WO | WO 02/38650 A1 | 5/2002 |
| WO | WO 02/071518 A1 | 9/2002 |
| WO | WO 02/081547 | 10/2002 |
| WO | WO 02/088219 A1 | 11/2002 |
| WO | WO 02/102881 A1 | 12/2002 |
| WO | WO 03/007411 A2 | 1/2003 |
| WO | WO 03/022412 A2 | 3/2003 |
| WO | WO 03/022412 A3 | 3/2003 |

OTHER PUBLICATIONS

Osaheni, J.A. and Jenekhe, S.A., "Synethesis of Processing of Heterocyclic Polymers as Electronic, Optoelectronic, and Nonlinear Optical Materials. 4. New Conjugated Rigid-Rod Poly(benzobis(imidazole))s," *Macomolecules* 28:1172-1179 (1995).

Y. Sakaguchi, et al., "Preparation and Properties of Sulfonated or Phosphonated Polybenzimidazoles and Polybenzoxazoles," *Am. Chem. Soc., Polymeric Materials Science and Engineering*, 84: 899-900 (2001).

Spry, R. J., et al. Anisotropic Ionic Conductivity of Lithium-Doped Sulfonated PBI, *J. Of Polymer Sci.: Part B: Polymer Physics*, 35: 2925-2933 (1997).

Rikukawa, M. et al., "Proton-conducting polymer electrolyte membranes based on hydrocarbon polymers," Prog. Polym. Sci. 25: 1463-1502 (2000).

Wainright, J.S. et al., "Acid-Doped Polybenzimidazoles: A New Polymer Electrolyte," J. Electrochem. Soc., 142(7): L121-L123 (1995).

* cited by examiner

FUNCTIONALIZED POLYAZOLES, METHOD FOR THE PRODUCTION THEREOF, AND USE THEREOF

RELATED APPLICATIONS

This application is the U.S. National Stage of International Application No. PCT/EP2003/007020, filed Jul. 2, 2003, published in German, and claims priority under 35 U.S.C. § 119 or 365 to Germany Application No. 102 30 477.7 filed on Jul. 6, 2002.

The present invention relates to polymers based on polyazoles and functionalized with phosphonic acid groups, with, owing to their excellent chemical and thermal properties, can be used for a variety of purposes and are particularly suitable for use in polymer electrolyte membrane (PEM) fuel cells.

Polyazoles such as CELAZOLE®-brand polybenzimidazoles have been known for a long time. Such polybenzimidazoles (PBIs) are usually prepared by reacting 3,3',4,4'-tetraaminobiphenyl with isophthalic acid or diphenylisophthalic acid or esters thereof in a solid-state polymerization. The resulting prepolymer solidifies in the reactor and is subsequently comminuted mechanically. The pulverulent prepolymer is subsequently fully polymerized at temperatures of up to 400° C. and the desired polybenzimidazole is obtained.

To produce polymer films, the PBI is dissolved in polar, aprotic solvents such as dimethylacetamide (DMAc) and a film is produced by classical methods.

Proton-conducting polyazole membranes, i.e. polyazole membranes doped with acid, for use in PEM fuel cells are already known. Thus, J. Electrochem. Soc., Volume 142, No. 7, 1995, pp. L121-L123, describes doping a polybenzimidazole in phosphoric acid. Here, the basic polyazole film is doped with concentrated phosphoric acid or sulfuric acid and subsequently acts as proton conductor and separator in polymer electrolyte membrane fuel cells (PEM fuel cells).

Due to the excellent properties of the polyazole polymer, such polymer electrolyte membranes can, when processed to produce membrane-electrode units (MEUs), be used in fuel cells at long-term operating temperatures above 100° C., in particular above 120° C. This high long-term operating temperature allows the activity of the catalysts based on noble metals which are present in the membrane-electrode unit (MEU) to be increased. Particularly when using reformates of hydrocarbons, significant amounts of carbon monoxide are present in the reformer gas and these usually have to be removed by means of a costly gas work-up or gas purification. The ability to increase the operating temperature enables significantly higher concentrations of CO impurities to be tolerated over the long term.

The use of polymer electrolyte membranes based on polyazole polymers allows, firstly, the costly gas work-up or gas purification to be omitted in some cases and, secondly, the catalyst loading in the membrane-electrode unit to be reduced. Both are indispensable prerequisites for large-scale use of PEM fuel cells, since otherwise the costs of a PEM fuel cell system are too high.

Rikukawa et al., Prog. Polym. Sci. 25 (2000) 1463-1502 discloses a C2-alkylphosphonated polybenzimidazole, i.e. a polybenzimidazole having covalent bound phosphonic acid groups. The conductivity observed is $10^{-3}$ S/cm, measured as a press compact. Although the polymer described has an elevated conductivity, it is unsuitable for the formation of polymer films by casting from polar, aprotic solvents such as dimethylacetamide (DMAc). The polymer obtained by deprotonation of polybenzimidazole with lithium hydride and subsequent reaction with 2-chloroethylphosphonic acid is, according to Rikukawa et al., insoluble in all organic solvents and therefore unsuitable for the production of polymer membranes by classical methods.

The authors assume that this is attributable to crosslinking of the polymer as a result of aggregation of the phosphonate groups during the substitution reaction.

A problem with known PEM fuel cells is that their performance decreases with increasing operating time. Furthermore, the efficiency of fuel cells in respect of the conversion of hydrogen needs to be improved.

It is therefore an object of the present invention to provide improved fuel cells which have a longer life and also better performance. Furthermore, the hydrogen conversion of the fuel cell should be increased.

The fuel cells should be able to be used, in particular, at operating temperatures above 100° C. and make do without additional humidification of the fuel gas.

Furthermore, ionomers are to be made available for use in high-temperature fuel cells, and the ionomers should be suitable, in particular, for polyazole membranes doped with phosphoric acid.

The objects mentioned above are achieved by polyazoles which are soluble in organic solvents and comprise the recurring structural units of the general formulae (1a), (1b), (1c)

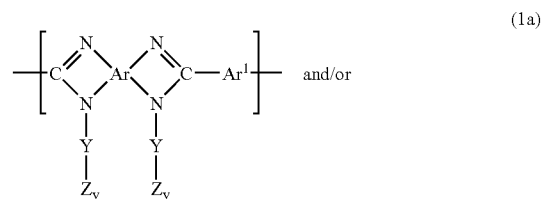

and/or (1a)

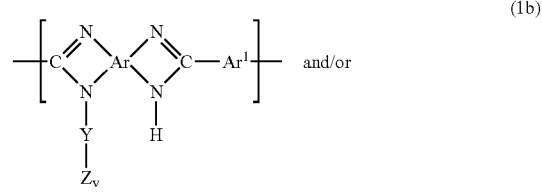

and/or (1b)

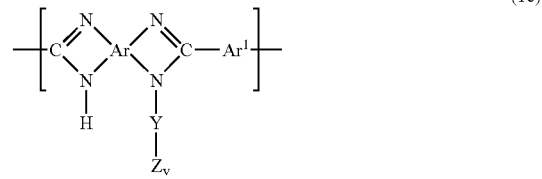

(1c)

and/or of the general formula (2)

(2)

where the radicals Ar, Ar1 and Ar2 are tetravalent, divalent or trivalent aromatic or heteroaromatic groups, Y is a bond or a group having from 1 to 20 carbon atoms, v is the number of groups Z which are bound to the group Y and is an integer from 1 to 10, and Z is a group of the general formula (3)

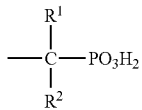
(3)

or of the general formula (4)

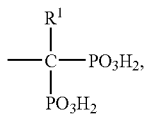
(4)

where R1 and R2 are each, independently of one another, a hydrogen atom or a group having from 1 to 20 carbon atoms.

The group Y is preferably a bond or a group having 1 or 2 carbon atoms.

This is particularly surprising to a person skilled in the art because it has hitherto had to be assumed, on the base of the disclosure of Rikukawa et al., that such a polymer would be insoluble in organic solvents as a result of the aggregation of phosphonate groups. For the purposes of the invention, soluble means that at least 0.1 gram of the polymer of the invention can be dissolved in 100 gram of N,N-dimethylacetamide at 100° C.

Solutions are usually homogeneous mixtures which can be employed for producing films. Insoluble material which may occur on dissolution can be separated off in a known manner.

The polymers of the invention have a number of further advantages. In particular, the polymers containing phosphonic acid groups have a high conductivity of at least 0.01 S/cm, in particular at least 0.02 S/cm, at 120° C. These values are determined by impedance spectroscopy.

The polymers containing phosphonic acid groups can be obtained, inter alia, by hydrolysis of polyazoles which have been modified with phosphonic ester groups. Such polymers are valuable intermediates which are likewise provided by the invention.

These functionalized polyazoles comprise recurring imidazole units of the general formula

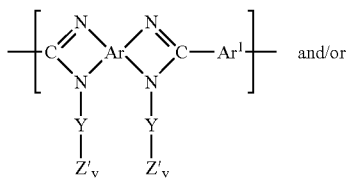

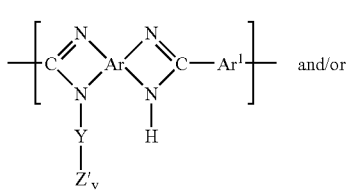

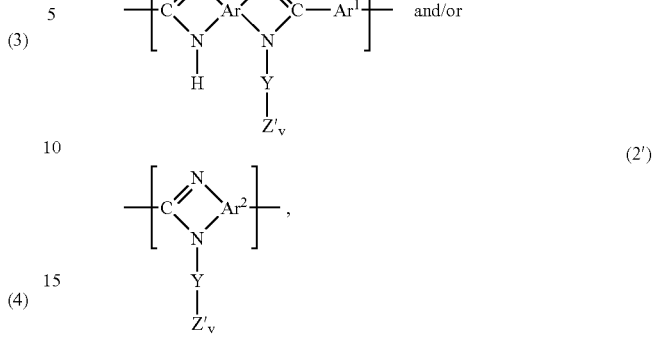

where the radicals Ar, $Ar^1$ and $Ar^2$ are tetravalent, divalent or trivalent aromatic or heteroaromatic groups, Y is a bond or a group having from 1 to 20 carbon atoms, v is the number of groups Z which are bound to the group Y and is an integer from 1 to 10 and Z' is a group of the general formula

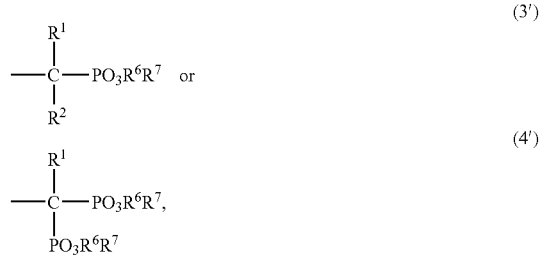

where $R^1$ and $R^2$ are each, independently of one another, a hydrogen atom or a group having from 1 to 20 carbon atoms and $R^6$ and $R^7$ are each, independently of one another, a group having from 1 to 20 carbon atoms.

The radicals Ar, Ar1 and Ar2 of the above formulae are tetravalent, divalent or trivalent aromatic or heteroaromatic groups which may be monocyclic or polycyclic. According to the invention, aromatic groups are radicals of monocyclic or polycyclic aromatic compounds which preferably have from 6 to 14, in particular from 6 to 12, carbon atoms. Heteroaromatic groups are aryl radicals in which at least one CH group has been replaced by N and/or at least two adjacent CH groups have been replaced by S, NH or O. Aromatic or heteroaromatic groups which are preferred for the purposes of the invention are derived from benzene, naphthalene, biphenyl, diphenyl ether, diphenylmethane, diphenyldimethylmethane, bisphenone, diphenyl sulfone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, pyrazine, pyrimidine, pyridazine, 1,3,5-triazine, 1,2,4-triazine, 1,2,4,5-triazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or 4H-quinolizine, diphenyl ether, anthracene and phenanthrene.

The aromatic and/or heteroaromatic groups may be substituted. Preferred substituents include halogens, groups having from 1 to 20 carbon atoms, nitro, sulfonic acid, sulfonic ester, sulfinic acid, sulfinic ester, thiol, cyanide, hydroxy groups and also groups of the general formulae $NR^8R^9$ and $N^+R^8R^9R^{10}$, where the radicals $R^8$, $R^9$ and $R^{10}$ are each, independently of one another, hydrogen, an alkyl group having from 1 to 6 carbon atoms, an alkoxy group having from 1 to 6 carbon atoms or an aryl group. According to the invention, the expression "halogen" refers to a fluorine, chlorine, bromine or iodine atom.

The expression "group having from 1 to 20 carbon atoms" refers to radicals of organic compounds having from 1 to 20 carbon atoms. Apart from the aromatic and heteroaromatic groups mentioned above, it encompasses, inter alia, alkyl, cycloalkyl, alkoxy, alkanoyl, alkoxycarbonyl groups, alkenyl groups having from 2 to 20 carbon atoms and also cycloalkoxy and cycloalkylthio groups having from 3 to 20 carbon atoms and heteroaliphatic groups which comprise, in particular, oxygen, nitrogen, sulfur and phosphorus atoms in addition to carbon and hydrogen atoms. The groups mentioned can be branched or unbranched.

Preferred alkyl groups include the methyl, ethyl, propyl, isopropyl, 1-butyl, 2-butyl, 2-methylpropyl, tert-butyl, pentyl, 2-methylbutyl, 1,1-dimethylpropyl, hexyl, heptyl, octyl, 1,1,3,3-tetramethylbutyl, nonyl, 1-decyl, 2-decyl, undecyl, dodecyl, pentadecyl and eicosyl group.

Preferred cycloalkyl groups include the cyclopropyl, cyclobutyl, cyclopentyl, cyclohexyl, cycloheptyl and cyclooctyl groups which may each be substituted by branched or unbranched alkyl groups.

Preferred alkenyl groups include the vinyl, allyl, 2-methyl-2-propenyl, 2-butenyl, 2-pentenyl, 2-decenyl and 2-eicosenyl group.

Preferred alkynyl groups include the ethynyl, propargyl, 2-methyl-2-propynyl, 2-butynyl, 2-pentynyl and 2-decynyl group.

Preferred alkanoyl groups include the formyl, acetyl, propionyl, 2-methylpropionyl, butyryl, valeroyl, pivaloyl, hexanoyl, decanoyl and dodecanoyl group.

Preferred alkoxycarbonyl groups include the methoxycarbonyl, ethoxycarbonyl, propoxycarbonyl, butoxycarbonyl, tert-butoxycarbonyl, hexyloxycarbonyl, 2-methylhexyloxycarbonyl, decyloxycarbonyl or dodecyloxycarbonyl group.

Preferred alkoxy groups include alkoxy groups whose hydrocarbon radical is one of the abovementioned preferred alkyl groups.

Preferred cycloalkoxy groups include cycloalkoxy groups whose hydrocarbon radical is one of the abovementioned preferred cycloalkyl groups.

Preferred heteroaliphatic groups include the abovementioned preferred cycloalkyl radicals in which at least one carbon unit has been replaced by O, S or an $NR^8$ group, where $R^8$ is hydrogen, an alkyl group having from 1 to 6 carbon atoms, an alkoxy group having from 1 to 6 carbon atoms or an aryl group.

According to the invention, very particular preference is given to branched or unbranched alkyl or alkoxy groups having from 1 to 20 carbon atoms, preferably 1 to 12 carbon atoms, advantageously from 1 to 6 carbon atoms, in particular from 1 to 4 carbon atoms, and cycloalkyl or cycloalkyloxy groups having from 3 to 20 carbon atoms, preferably from 5 to 6 carbon atoms.

Although one or more hydrogen atoms in the abovementioned radicals can be replaced by the abovementioned halogen atoms, preferably chlorine or fluorine, thiol or hydroxy groups or groups of the general formulae $NR^8R^9$ and $N^+R^8R^9R^{10}$, where the radicals $R^8$, $R^9$ and $R^{10}$ are each, independently of one another, hydrogen, an alkyl group having from 1 to 6 carbon atoms, an alkoxy group having from 1 to 6 carbon atoms or an aryl group, unsubstituted radicals have been found to be particularly advantageous.

For the purposes of the present invention, Ar1 can have any substitution pattern; in the case of phenylene, for example, $Ar^1$ can be ortho-, meta- or para-phenylene. Particularly preferred groups Ar, $Ar^1$ and $A^2$ are derived from benzene and biphenylene, which may also be substituted.

The polymer of the invention can further comprise recurring azole units of the general formula ("copolymer")

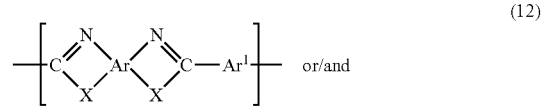

(12)

or/and

(13)

The radicals X are an oxygen atom (benzoxal unit), a sulfur atom (benzothiazole unit) or an amino group (benzimidazole unit) which may bear a group having 1-20 carbon atoms, preferably a branched or unbranched alkyl, cycloalkyl or alkoxy group or a substituted or unsubstituted aryl or heteroaryl group, as further radical.

If polymers having recurring azole units of the formula (12) are used for the purposes of the present invention, the radicals X within a recurring unit are, according to a preferred embodiment, identical.

Although a polymer which can be used according to the invention can in principle have different recurring units, it preferably has only identical recurring units, without this constituting a restriction.

According to a particular aspect of the present invention, the molar ratio of phosphorus to nitrogen, viz. the n(P)/n(N) ratio, measured by means of elemental analysis is from 0.02 to 0.5, preferably from 0.05 to 0.35 and very particularly preferably from 0.07 to 0.25, without this constituting a restriction.

The polyazoles modified with phosphonate groups can be prepared by a process in which polymers comprising recurring imidazole units of the general formula

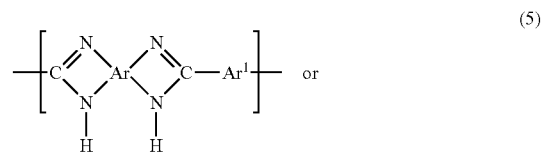

(5)

or

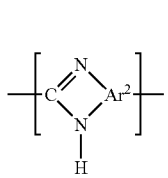
(6)

are dissolved in a solvent in a step A).

In a further preferred embodiment of the present invention, a copolymer comprising at least two units of the formula (5) and/or (6) which differ from one another is used as polymer comprising recurring imidazole units. Furthermore, these copolymers can further comprise groups of the formulae (12) and/or (13).

The number of recurring imidazole units (5) and/or (6) in the polymer used is preferably greater than or equal to 10. Particularly preferred polymers comprise at least 100 recurring imidazole units (5) and/or (6).

For the purposes of the present invention, preference is given to using polymers comprising recurring benzimidazole units. An example of an extremely advantageous polymer comprising recurring benzimidazole units has the formula (5a):

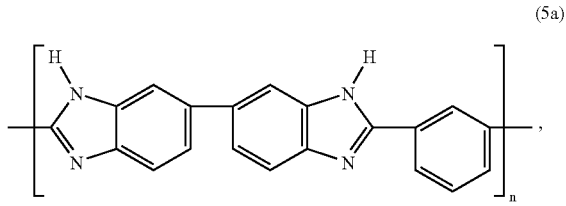
(5a)

where n is an integer greater than or equal to 10, preferably greater than or equal to 100.

Solvents include, in particular, polar organic solvents, in particular N,N-dimethylformamide, N,N-dimethylacetamide, dimethyl sulfoxide and N-methyl-2-pyrollidone, preferably N,N-dimethylacetamide.

The polyazoles preferably have a high molecular weight. Measured as intrinsic viscosity, this is preferably at least 1.0 dl/g and particularly preferably at least 1.3 dl/g, measured at 25° C. in DMAc, without this constituting a restriction.

To measure the intrinsic viscosity, 0.4 g of the polyazole according to the invention is dissolved in 60 ml of 98% sulfuric acid at 80° C. The intrinsic viscosity of this solution is determined at 25° C. using an Ubbelhode viscometer in accordance with DIN 53728.

The reaction mixture obtained in step A) is subjected to deprotonation of the aromatic NH groups by means of a base in step B). Preferred bases have a p$K_B$ at 25° C. of less than or equal to 5, in particular less than or equal to 4, particularly preferably less than or equal to 2.

Bases which are particularly preferably used according to the invention include, inter alia, $NH_3$, $R'_3N$, $R'NH_2$ and $R'_2NH$ and also salts of the anions

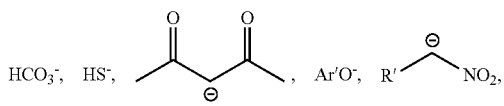

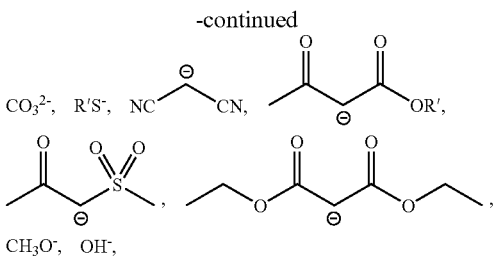

cyclopentadienyl anion, $R'CH_2O^-$, $R'_2CHO^-$, $R'_3CO^-$, $R'CONH^-$,

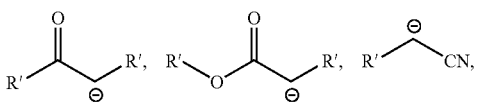

$HC\equiv C^-$, $Ar'_3C^-$, $Ar'_2CH^-$, $H^-$, $NH_2^-$, $PhCH_2^-$, allyl anion, $Ph^-$, $CH_2=CH^-$, Cyclo-$C_3H_5^-$, $CH_3^-$, $C_2H_5^-$, $(CH_3)_2CH^-$ and $(CH_3)_3C^-$. In these formulae, R' is an alkyl or cycloalkyl radical having from 1 to 20 carbon atoms. Ar' is an aryl radical. Ph is a phenyl group. The salts mentioned preferably have alkali metal cations such as $Li^+$, $Na^+$, $K^+$, $Rb^+$ and $Cs^+$, alkaline earth metal cations such as $Be^{2+}$, $Mg^{2+}$ and $Ca^{2+}$, $Al^{3+}$, $Zn^{2+}$, $^+N(CH_3)_4$, $^+N(C_2H_5)_4$, $^+N(C_3H_7)_4$, in particular $Li^+$ and $Na^+$, as counterion. $Li_2CO_3$, LiH and NaH, in particular $Li_2CO_3$, have been found to be very particularly useful for the deprotonation.

The amount of base to be used depends on the desired degree of modification of the polymer. Preference is given to using from 0.01 to 5 molar equivalents, advantageously from 0.1 to 2.5 molar equivalents, more preferably from 0.7 to 1.5 molar equivalents, in particular from 0.9 to 1.1 molar equivalents, base, based on N—H groups in the starting polymer.

The polyazole solution prior to reaction with the base preferably has only a low water content. In a particular embodiment, the water content of the solution is 0.5% by weight or less, particularly preferably 0.3% by weight or less.

The reaction of the polymer comprising recurring imidazole units with the base can be carried out at atmospheric pressure, subatmospheric pressure or superatmospheric pressure. The reaction temperature is also not critical. However, it is generally in the range −20°-200° C., preferably 20°-200° C. and particularly preferably 50°-120° C., without this constituting a restriction.

The reaction time depends on the above-described parameters. Significant evolution of gas usually occurs after only a few minutes, without this constituting a restriction. If the complete deprotonation is to be achieved, a longer reaction time which can be in the range from 10 minutes to 48 hours will sometimes be necessary. To avoid secondary reactions, the use of inert gas, in particular nitrogen and argon, has likewise been found to be particularly useful.

For the purposes of the present invention, the reaction mixture from step B) is reacted in a further step C) with at least one phosphonate of the general formulae

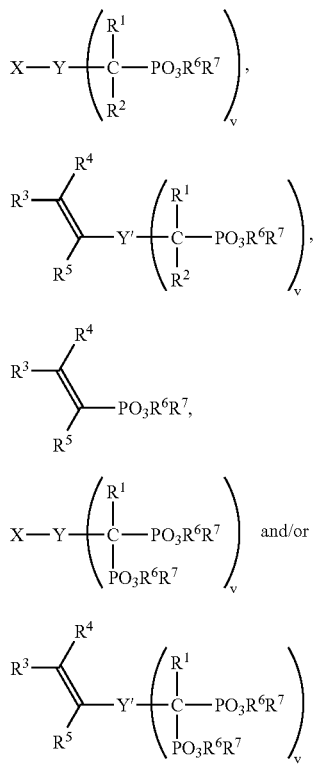

preferably a phosphonate of the general formula (7), (8) and/or (9). Here, the phosphonates can be used individually or as a mixture.

The radicals $R^1$ and $R^2$ are each, independently of one another, a hydrogen atom or a group having from 1 to 20 carbon atoms.

The radicals $R^3$, $R^4$ and $R^5$ are each, independently of one another, a hydrogen atom or a group having from 1 to 20 carbon atoms, preferably a branched or unbranched alkyl, cycloalkyl or alkoxy group or a substituted or unsubstituted aryl or heteroaryl group. Alkyl, cycloalkyl, alkoxy, aryl or heteroaryl groups which are particularly preferred according to the invention are the abovementioned preferred radicals, as long as they have from 1 to 20, preferably from 1 to 12, advantageously from 1 to 6, in particular from 1 to 4, carbon atoms.

It has been found to be very particularly appropriate for at least one of the radicals $R^3$, $R^4$ and $R^5$ to be a hydrogen atom, and preference is given to all of the radicals $R^3$, $R^4$ and $R^5$ being hydrogen atoms.

The radicals $R^6$ and $R^7$ are each, independently of one another, a group having from 1 to 20 carbon atoms.

The radical Y is a bond or a group having from 1 to 20 carbon atoms, preferably a branched or unbranched alkyl, cycloalkyl or alkoxy group or a substituted or unsubstituted aryl or heteroaryl group. Alkyl, cycloalkyl, alkoxy, aryl or heteroaryl groups which are particularly preferred according to the invention include the abovementioned preferred radicals, as long as they have from 1 to 20, preferably from 1 to 12, advantageously from 1 to 6, in particular from 1 to 4, carbon atoms. The group Y is particularly preferably a group having 2 carbon atoms.

The radical X is a leaving group. For the purposes of the invention, leaving groups are the groups which are split off in the course of a substitution reaction, in the present case a nucleophilic substitution reaction. For further details, reference may be made to the specialist literature, for example March, Jerry, Advanced Organic Chemistry, Wiley Interscience, 1985, in particular p. 179.

Preferred leaving groups include the following radicals:
halogen atoms, preferably a chlorine atom, bromine atom or iodine atom, groups of the general formula $$R-SO_2^-,$$

where R is a fluorinated or unfluorinated, linear or branched aliphatic or cycloaliphatic radical or a substituted or unsubstituted aromatic radical, preferably an alkyl radical having from 1 to 6 carbon atoms, $CF_3$, phenyl or para-tosyl, alkylsulfates, preferably methylsulfate, ethylsulfate, carboxylates, preferably formate, acetate.

Chlorine atoms, bromine atoms and para-toluenesulfonates have been found to be particularly useful.

The index v indicates the number of groups Z which are bound to the group Y and is an integer in the range from 1 to 10, preferably 1.

The radical Y' is a bond or a group having from 1 to 20 carbon atoms, preferably a branched or unbranched alkyl, cycloalkyl or alkoxy group or a substituted or unsubstituted aryl or heteroaryl group. Alkyl, cycloalkyl, alkoxy, aryl or heteroaryl groups which are particularly preferred according to the invention include the abovementioned preferred radicals, as long as they have from 1 to 20, preferably from 1 to 12, advantageously from 1 to 6, in particular from 1 to 4, carbon atoms.

Phosphonates which are very particularly advantageous for the purposes of the invention have the formulae (7a) and (8a):

where m is an integer from 0 to 11, i.e. 0, 1, 2, 3, 4, 5, 6, 7, 8, 9, 10 and 11, preferably from 1 to 6, advantageously from 2 to 4, in particular 2.

The amount of phosphonate depends on the desired degree of modification. Preference is given to using from 0.01 to 5 molar equivalents, advantageously from 0.1 to 2.5 molar equivalents, more preferably from 0.7 to 1.5 molar equivalents, in particular from 0.9 to 1.1 molar equivalents, of phosphonate, based on N—H groups in the starting polymer.

The phosphonates which can be used for preparing the polymers are known to those skilled in the art.

The reaction of the deprotonated polymer comprising recurring imidazole units with the phosphonate can be carried out at atmospheric pressure, subatmospheric pressure or superatmospheric pressure. The reaction temperature is also not critical. however, it is generally in the range from −20° to 200° C., preferably from 20° to 200° C. and particularly preferably 50°-120° C., without this constituting a restriction. The reaction time depends on the above-described parameters. In general, the reaction will be concluded after a time in the range from 2 to 48 hours.

To avoid secondary reactions, the use of inert gas, in particular nitrogen and argon, has likewise been found to be particularly useful.

To prepare polyazoles modified with phosphonic acid groups, the reaction mixture from step C) can be acidified with an acid. Suitable acids preferably have a $pK_A$ at 25° C. of less than 6, in particular less than 5, particularly preferably less than 4. Here, the $pK_A$ is the negative logarithm to the base 10 of the acid constant in water.

Acids which are particularly preferably used according to the invention include, inter alia, $HF-SBF_5$, $HClO_4$, $HI$, $H_2SO_4$, $HBr$, $HCl$, $Ar'SO_3H$, where $Ar'$ is an aryl radical, $CH(CN)_3$, $HNO_3$, $HF$, $HNO_2$, $R'COOH$, where $R'$ is an alkyl or cycloalkyl radical having from 1 to 20 carbon atoms, $HCOCH_2COH$, $H_2CO_3$, $H_2SO_4$ and $H_3PO_4$.

The acidification of the reaction mixture from step B) can be carried out at atmospheric pressure, subatmospheric pressure, or superatmospheric pressure. The reaction temperature is also not critical. However, it is generally in the range −20°-200° C., preferably 20°-200° C. and particularly preferably 25°-50° C., without this constituting a restriction.

The reaction time depends on the above-described parameters. Complete reaction is generally achieved after a reaction time in the range from 10 minutes to 48 hours.

The structure of the modified polyazoles is obvious to a person skilled in the art. For example, when a phosphonate of the general formula (9) is used, the addition of the deprotonated polymer generally occurs at the carbon atom of the double bond which bears the radicals $R^3$ and $R^4$. The reaction of a polymer comprising recurring imidazole units of the formula (6) therefore usually leads to a polymer comprising recurring imidazole units of the general formula

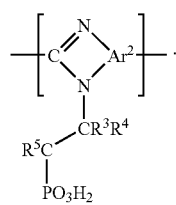

(2a)

In contrast, the use of a phosphonate of the general formula (8) generally results in addition onto the double bond in the opposite direction. The reaction of a polymer comprising recurring imidazole units of the formula (6) therefore usually leads to a polymer comprising recurring imidazole units of the general formula

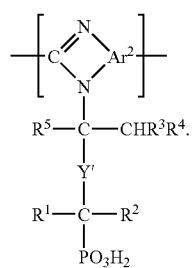

(2b)

The isolation of the polymer containing phosphonic acid groups and comprising recurring imidazole units of the general formula (1) and/or (2) can be carried out in a manner known per se. In a preferred embodiment of the present invention, it is isolated by evaporation of the solvent at atmospheric, subatmospheric or superatmospheric pressure. In a further preferred embodiment of the present invention, it is isolated by precipitation in a nonsolvent, preferably water, alcohol or a mixture thereof, which is used in an appropriate excess.

Furthermore, the polymer of the invention has good solubility in polar solvents. This is a great advantage in further processing, because it can also be processed further from solution. The solubility of the polymer containing phosphonic acid groups in N,N-dimethylacetamide at 100° C. is preferably at least 0.1 g, advantageously at least 1 g, in particular at least 5 g, in each case based on 100 g of solution.

To increase the conductivity further, the polymer of the invention containing phosphonic acid groups can advantageously be doped. Doping, i.e. the presence of dopants in the polymer, increases the proton conductivity compared to the undoped polymer. Dopants for the polymers of the invention are acids, preferably inorganic acids. For the present purposes, acids are all known Lewis and Brnsted acids, preferably inorganic Lewis and Brnsted acids. The use of polyacids, in particular isopolyacids and heteropolyacids, and also mixtures of various acids is also possible.

The conductivity of the polymer of the invention can be influenced via the degree of doping. The conductivity increases with rising concentration of dopant until a maximum value has been reached. According to the invention, the degree of doping is reported as mole of acid per mole of repeating unit of the polymer. For the purposes of the present invention, a degree of doping of from 3 to 30, in particular from 5 to 18, is preferred.

Dopants which are particularly preferred according to the invention are sulfuric acid and phosphoric acid. A very particularly preferred dopant is phosphoric acid ($H_3PO_4$). This acid can be used in a concentration of less than or equal to 85% by weight, preferably in a range from 30 to 83% by weight, particularly preferably in a range from 50 to 80% by weight and very particularly preferably in a range from 60 to 75% by weight.

Conventional polyazole films are usually doped with a phosphoric acid having a concentration of at least 85% by weight. However, a problem here is that a phosphoric acid having such a high concentration can lead to a decrease in the mechanical stability of the membrane, so that this membrane fails prematurely in a fuel cell.

However, it has surprisingly been found that polyazole modified with phosphonic acid displays a significantly better swelling behavior than conventional polyazole, with the swelling increasing with increasing molar P/N ratio.

The polyazole modified with phosphonic acid groups is particularly preferably used as ionomer. The ionomer is used, in particular, for the treatment of the electrode which has been doped with a catalyst. Suitable catalysts comprise, inter alia, noble metals such as platinum and/or ruthenium. The use of an ionomer according to the invention improves the contact between the catalyst and the PEM and the performance and the long-term stability of the fuel cell is surprisingly increased.

Furthermore, a polyazole modified with phosphonic acid groups is suitable, in particular, for producing membranes for high-temperature fuel cells. For this purpose, use is made, in particular, of polyazoles whose molar P/N ratio is in the range from 0.02 to 0.25, preferably from 0.05 to 0.21, particularly preferably from 0.07 to 0.17. It has surprisingly been found that such a polyazole has a very high conductivity combined with a relatively high stability after doping with phosphoric acid having a concentration in the abovementioned ranges, so that doped polyazole films are especially suitable for use as membranes in fuel cells.

Owing to its property profile, the polymer of the invention is also suitable for application as coating to a known polyelectrolyte membrane or can be employed as a blend with known polymers, in particular polyazoles, for producing polyelectrolyte membranes. A conventional polyelectrolyte membrane can be provided on either one side or both sides with a layer of modified polyazoles, with the thickness of a polyazole coating generally being in the range from 5 to 30 µm, preferably from 10 to 25 µm. The thickness of the polyelectrolyte membrane is generally in the range from 5 µm to 2000 µm, preferably from 10 µm to 1000 µm, particularly preferably from 30 µm to 200 µm, without this constituting a restriction.

The present invention also provides a membrane-electrode unit comprising at least one polymer containing phosphonic acid groups according to the invention. For further information on membrane-electrode units, reference may be made to the specialist literature, in particular the patents U.S. Pat. Nos. 4,191,618, 4,212,714 and 4,333,805, whose disclosure is explicitly incorporated by reference into the present patent application.

Possible fields of use for the polymers of the invention which have been modified with phosphonic acid groups include, inter alia, the use in fuel cells, in electrolysis, in capacitors and in battery systems. The polymer of the invention is particularly preferably used in fuel cells. Accordingly, fuel cells comprising the polyazoles which have been modified according to the invention are also provided by the present invention.

The invention is illustrated below by means of examples and comparative examples, without the invention being restricted to these examples.

The conductivity of the membrane depends greatly on the content of acid groups expressed by the ion exchange capacity (IEC). To measure the ion exchange capacity, a specimen having a diameter of 3 cm is stamped out and placed in a glass beaker containing 100 ml of water. The acid liberated is titrated with 0.1 M NaOH. The specimen is subsequently taken out, excess water is dabbed off and the specimen is dried at 160° C. for 4 hours. The dry weight, $m_0$, is then determined gravimetrically to a precision of 0.1 mg. The ion exchange capacity is then calculated from the consumption of 0.1M NaOH to the first titration end point, $V_1$ in ml, and the dry weight, $m_0$ in mg, according to the following formula:

$$IEC = V_1 * 300 / m_0$$

The swelling of membranes is calculated as the increase in area after doping with acid.

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated by means of a simple model consisting of a parallel arrangement of an ohmic resistance and a capacitor. The specimen cross section of the membrane doped with phosphoric acid is measured immediately before installing the specimen. To measure the temperature dependence, the measurement cell is brought to the desired temperature in an oven and the temperature is regulated by means of a Pt-100 resistance thermometer positioned in the immediate vicinity of the specimen. After the desired temperature has been reached, the specimen is maintained at this temperature for 10 minutes before commencement of the measurement.

General Procedure for the Phosphoration of PBI:

80 g of a 15% strength polybenzimidazole solution in N,N-dimethylacetamide (DMAc) were slowly heated to 80° C. and diluted to 350 ml with DMAc. 2.1 equivalents per element unit of the appropriate base, e.g. 11.2 g of $K_2CO_3$ for Example 3, were then added, as a result of which the solution became deep red in color. The mixture was stirred at 80° C. for 3 hours. Two equivalents per element unit of 2-bromoethylphosphonate (19.0 g) were then added dropwise to the reaction mixture from a dropping funnel. The reaction mixture was stirred at 85° C. for 60 hours. After acidification, the reaction mixture was poured into three liters of a water/ethanol mixture (1:1). The precipitate was filtered off, washed thoroughly with water and methanol and dried. The polymer was dissolved in DMAc, reprecipitated in methanol and dried under reduced pressure for at least 24 hours.

| Specimen | Base | Reaction time [h] | n(P)/n(N) |
|---|---|---|---|
| 1 | $K_2CO_3$ | 36 | 0.065 |
| 2 | $K_2CO_3$ | 50 | 0.1 |
| 3 | $K_2CO_3$ | 60 | 0.155 |
| 4 | NaH | 48 | 0.205 |
| 5 | NaH | 60 | 0.255 |
| 6 | NaH | 72 | 0.28 |
| 7 | $K_2CO_3$ | 72 | 0.245 |

Properties of Specimen 1-5 after Doping in 85% Strength $H_3PO_4$:

| Specimen | n(P)/n(N) | Swelling in 85% $H_3PO_4$ | IEC [meq/g] |
|---|---|---|---|
| 1 | 0.065 | 24% | 112.41 |
| 2 | 0.1 | 110% | 205.14 |
| 3 | 0.155 | not measurable | 245.7 |
| 4 | 0.205 | not measurable | 356.6 |
| 5 | 0.255 | not measurable | specimen is dissolved |

Conductivity Results for Specimen 3 after Doping with Different Concentrations of $H_3PO_4$:

| Temp. [° C.] | 50% $H_3PO_4$ Conductivity [S/cm] | 60% $H_3PO_4$ Conductivity [S/cm] | 70% $H_3PO_4$ Conductivity [S/cm] | 80% $H_3PO_4$ Conductivity [S/cm] |
|---|---|---|---|---|
| 25 | 0.0016 | 0.0033 | 0.016 | 0.084 |
| 40 | 0.0005 | 0.0008 | 0.008 | 0.056 |
| 60 | 0.0004 | 0.0009 | 0.007 | 0.045 |
| 80 | 0.0008 | 0.0017 | 0.010 | 0.051 |
| 100 | 0.0016 | 0.0037 | 0.018 | 0.064 |
| 120 | 0.0034 | 0.0075 | 0.029 | 0.077 |
| 140 | 0.0062 | 0.0122 | 0.034 | 0.080 |

Comparative Examples as Described by Rikukawa et al.:

A.) Model Reactions

A.1) Model Reaction 1

20 mg (2.4 mmol) of LiH were added to 25 ml of a solution of 0.44 g (2.3 mmol) of 2-phenylbenzimidazole in N,N-dimethylacetamide (DMAc). The mixture was heated to 85° C. and stirred at this temperature for 2 hours. 0.36 g of 2-chloroethylphosphonate (90%, Aldrich) and 0.32 ml of triethylamine (dissolved in 25 ml of DMAc) were then added dropwise at 25° C. over a period of 30 minutes. The reaction mixture was stirred at room temperature for 24 hours and then poured into 200 ml of water. The precipitate was filtered off and dried. The yield was 80%. A main peak was found at 366.7 g/mol in the FD mass spectrum, while the expected product has a molecular weight of 302 g/mol. An examination of the water filtrate was likewise unsuccessful.

A.2) Model Reaction 2

40 mg (4.8 mmol) of LiH were added to 25 ml of a solution of 0.55 g (2.8 mmol) of 2-phenylbenzimidazole in N,N-dimethylacetamide (DMAc). The mixture was heated to 85° C.

and stirred at this temperature for 2 hours. 0.54 g of 2-chloroethylphosphonate (90%, Aldrich) and 1 ml of triethylamine (dissolved in 25 ml of DMAc) were then added dropwise at 25° C. over a period of 30 minutes. The reaction mixture was stirred at room temperature for 24 hours and then poured into 200 ml of water. The precipitate was filtered off and dried. The yield was 85%. No main peak at 302 g/mol was found in the FD mass spectrum. The $^1$H-NMR spectrum indicated that the solid was the starting component 2-phenylbenzimidazole.

A.3) Model Reaction 3

130 mg (3.25 mmol) of NaH (60% dispersion in oil) were added to 25 ml of a solution of 0.51 g (2.6 mmol) of 2-phenylbenzimidazole in N,N-dimethylacetamide (DMAc). The mixture was heated to 85° C. and stirred at this temperature for 2 hours. 0.44 g of 2-chloroethylphosphonate (90%, Aldrich) and 1 ml of triethylamine (dissolved in 25 ml of DMAc) were then added dropwise at 25° C. over a period of 30 minutes. The reaction mixture was stirred at room temperature for 24 hours and then poured into 200 ml of water. The precipitate was filtered off and dried. The yield was 74%. No main peak at 302 g/mol was found in the FD mass spectrum. An examination of the water filtrate was likewise unsuccessful.

A.4) Model Reaction 4

3 ml of triethylamine were added to 25 ml of a solution of 0.41 g (2.1 mmol) of 2-phenylbenzimidazole in N,N-dimethylacetamide (DMAc) at 25° C. over a period of 30 minutes. The mixture was heated to 50° C. 0.36 g (2.2 mmol) of 2-chloroethylphosphonate (90%, Aldrich) was then added dropwise from a dropping funnel. The reaction mixture was stirred at 50° C. for 24 hours and then poured into 200 ml of water. The precipitate was filtered off and dried. The yield was 85%. No main peak at 302 g/mol was found in the FD mass spectrum. An examination of the water filtrate was likewise unsuccessful.

B.) Polymer-Analogous Reaction 20 g of a 15% strength polybenzimidazole solution in N,N-dimethylacetamide (DMAc) were slowly heated to 85° C. and diluted with 25 ml of DMAc. 80 mg of LiH were then added, as a result of which the solution became deep red in color. The mixture was stirred at 85° C. for 3 hours. 3.12 g of 2-chloroethylphosphonate (dissolved in 25 ml of DMAc, 2.0 equivalents per repeating unit) and 3.0 ml of triethylamine were then added dropwise to the reaction mixture from a dropping funnel. The reaction mixture was stirred at 25° C. for 48 hours. After acidification, the reaction mixture was poured into 1 l of a water/ethanol mixture (1:1). The dark brown precipitate was filtered off, washed thoroughly with acetone and ethanol and dried at 60° C. under reduced pressure for 48 hours.

Yield: 3.7 g (53% of theory)

Solubility: Insoluble in DMSO, only soluble in concentrated sulfuric acid

Degree of modification n(P)/n(N): 0.25 (4 g were obtained)

The invention claimed is:

1. A functionalized polyazole comprising at least one recurring imidazole unit selected from the group consisting of (1a), (1b), (1c) and (2):

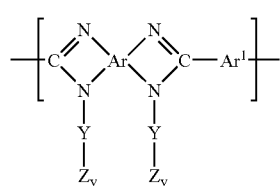
(1a)

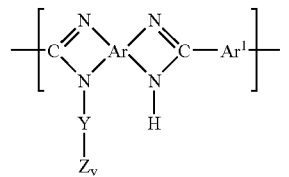
(1b)

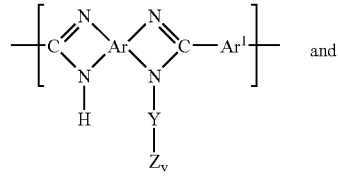
(1c) and

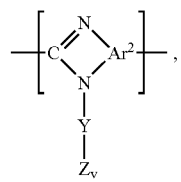
(2)

where the radicals Ar, Ar$^1$ and Ar$^2$ are tetravalent, divalent or trivalent aromatic or heteroaromatic groups, Y is a bond or a group having from 1 to 20 carbon atoms, v is an integer from 1 to 10 and Z is a group of the general formula

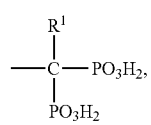
(4)

where each R$^1$ is independently of one another, a hydrogen atom or a group having from 1 to 20 carbon atoms, characterized in that the solubility of the polyazole in N,N-dimethylacetamide is at least 0.1 g, based on 100 g of solution, at 100° C.

2. A functionalized polyazole comprising at least one recurring imidazole unit selected from the group consisting of (1a), (1b), (1c) and (2'):

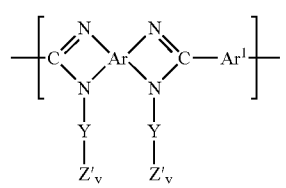
(1a)

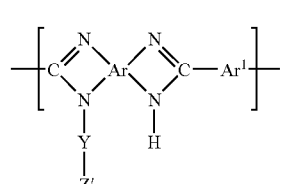
(1b)

-continued

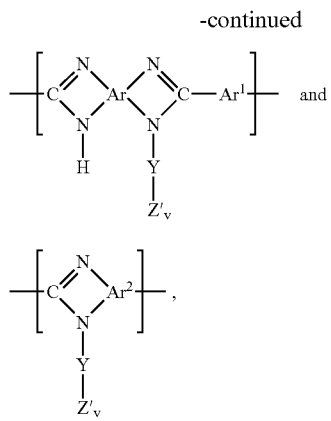

where the radicals Ar, $Ar^1$ and $Ar^2$ are tetravalent, divalent or trivalent aromatic or heteroaromatic groups, Y is a bond or a group having from 1 to 20 carbon atoms, v is an integer from 1 to 10 and Z' is a group of the general formula

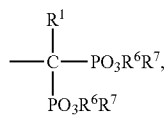

where each $R^1$ is independently of one another, a hydrogen atom or a group having from 1 to 20 carbon atoms and $R^6$ and $R^7$ are each, independently of one another, a group having from 1 to 20 carbon atoms.

3. The functionalized polyazole of claim 1, further comprising recurring benzimidazole units of the formula (5a):

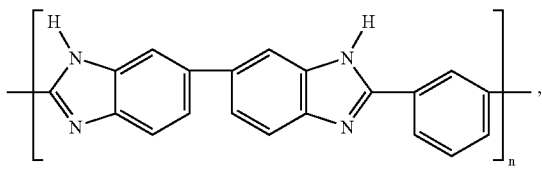

where n is an integer greater than or equal to 10.

4. The polyazole of claim 1, characterized in that it is doped with an acid.

5. The polyazole as claimed in claim 4, characterized in that the degree of doping, expressed as mole of acid per mole of repeating units of the polymer, is from 3 to 15.

6. The polyazole of claim 1, characterized in that the group Y is a radical having 1 or 2 carbon atoms.

7. The polyazole of claim 1, characterized in that it has a molar ratio of phosphorus to nitrogen, P/N, measured by means of elemental analysis in the range from 0.02 to 0.5.

8. A process for preparing functionalized polyazoles of claim 2, comprising the steps of A) dissolving a polymer comprising a recurring imidazole unit selected from the units described by the general formulas of (5) or (6):

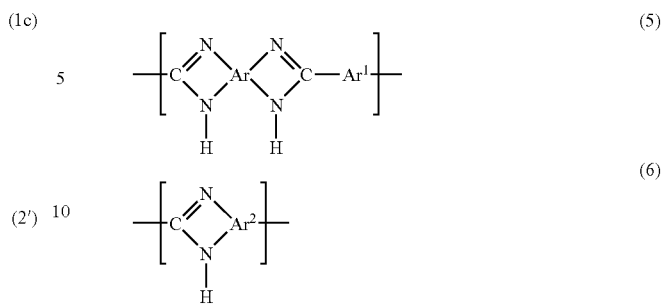

in a solvent, to thereby form a first solution;

B) reacting the first solution with a base to form a second solution,

C) reacting the second solution with at least one phosphonate selected from (10) and (11)

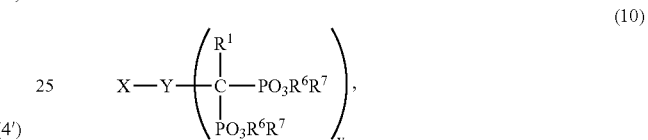

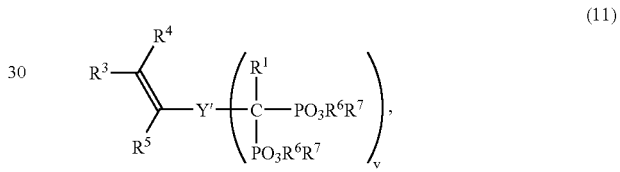

wherein

Y is a bond or a group having from 1 to 20 carbon atoms;

v is an integer from 1 to 10;

each $R^1$ is independently of one another, a hydrogen atom or a group having from 1 to 20 carbon atoms;

$R^3$, $R^4$ and $R^5$ are each, independently of one another, a hydrogen atom or a group having from 1 to 20 carbon atoms, $R^6$ and $R^7$ are each, independently of one another, a hydrogen, or a group having from 1 to 20 carbon atoms, X is a leaving group and Y' is a bond or a group having from 1 to 20 carbon atoms.

9. The process of claim 8, further including adding an acid to the solution of step C.

10. The process of claim 8, further including adding a base having a $pK_B$ at 25° C. of less than 7 to the solvent in step A.

11. A polyazole obtainable by a process of claim 9.

12. A polymer electrolyte membrane coated with polyazoles of claim 1.

13. A membrane-electrode unit comprising a polymer electrolyte membrane of claim 12.

14. A polymer electrolyte membrane comprising polyazoles of claim 1.

15. A membrane-electrode unit comprising a polymer electrolyte membrane of claim 14.

16. A fuel cell comprising a membrane-electrode unit of claim 15.

17. A membrane-electrode unit comprising ionomers of the polyazoles of claim 1.

18. A fuel cell comprising a membrane-electrode unit of claim 17.

* * * * *

UNITED STATES PATENT AND TRADEMARK OFFICE
CERTIFICATE OF CORRECTION

PATENT NO.      : 7,445,864 B2
APPLICATION NO. : 10/520326
DATED           : November 4, 2008
INVENTOR(S)     : Klaus Muellen et al.

It is certified that error appears in the above-identified patent and that said Letters Patent is hereby corrected as shown below:

Claim 2 col. 16
Line 60, delete the following structural formula:

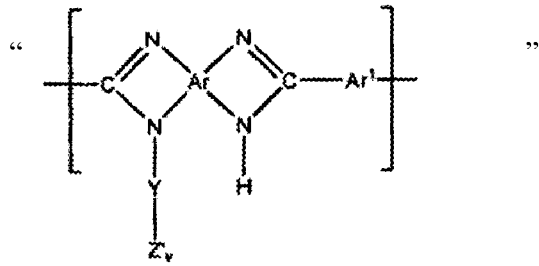

and insert therefor:

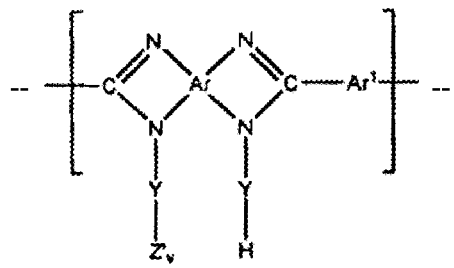

Claim 2 col. 17
Line 5, delete the following structural formula:

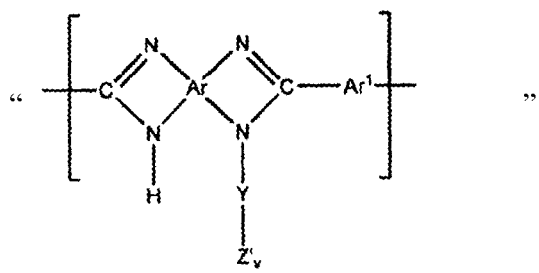

UNITED STATES PATENT AND TRADEMARK OFFICE
CERTIFICATE OF CORRECTION

PATENT NO. : 7,445,864 B2
APPLICATION NO. : 10/520326
DATED : November 4, 2008
INVENTOR(S) : Klaus Muellen et al.

It is certified that error appears in the above-identified patent and that said Letters Patent is hereby corrected as shown below:

and insert therefor:

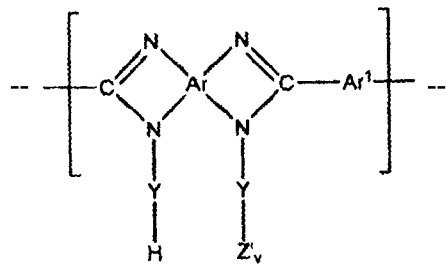

Signed and Sealed this

Tenth Day of February, 2009

JOHN DOLL
*Acting Director of the United States Patent and Trademark Office*